United States Patent [19]
Rudolphy

[11] 4,207,219
[45] Jun. 10, 1980

[54] PROCESS FOR THE PREPARATION OF PARTIAL ESTERS AND PARTIAL SALTS OF REACTION PRODUCTS OF NATURAL RESINIC ACIDS AND DICARBOXYLIC ACID COMPOUNDS

[75] Inventor: Albert Rudolphy, Wiesbaden-Biebrich, Fed. Rep. of Germany

[73] Assignee: Hoecht Aktiengesellschaft, Frankfurt, Fed. Rep. of Germany

[21] Appl. No.: 967,020

[22] Filed: Dec. 6, 1978

[30] Foreign Application Priority Data

Jan. 23, 1978 [DE] Fed. Rep. of Germany ....... 2802702

[51] Int. Cl.² ............................................. C08L 93/00
[52] U.S. Cl. .............................. 260/25; 260/DIG. 38; 260/336
[58] Field of Search ........................... 260/25, DIG. 38

[56] References Cited

U.S. PATENT DOCUMENTS

| 3,880,788 | 4/1975 | Rudolphy | 260/25 |
| 4,139,500 | 2/1979 | Rudolphy | 260/25 |

FOREIGN PATENT DOCUMENTS

| 4716602 | 2/1951 | Canada | 260/25 |
| 46-11354 | 3/1971 | Japan | 260/25 |
| 1230240 | 4/1971 | United Kingdom | 260/25 |
| 1508958 | 4/1978 | United Kingdom . | |

*Primary Examiner*—H. S. Cockeram
*Attorney, Agent, or Firm*—Quaintance, Murphy & Richardson

[57] ABSTRACT

A process for the preparation of partial esters and partial salts with divalent metal compounds of reaction products of natural resinic acids and unsaturated dicarboxylic acids which typically comprises the following steps:

(a) reacting a natural resinic acid with an olefinically unsaturated dicarboxylic acid;
(b) partially neutralizing the product of step (a) with a calcium compound;
(c) partially esterifying the product of step (b) with a polyhydric alcohol;
(d) reacting the product of step (c) with a resol or a mixture of resols; and
(e) continuing the reaction of step (d) to complete partial salt formation and partial esterification.

The product is useful for printing inks.

10 Claims, No Drawings

PROCESS FOR THE PREPARATION OF PARTIAL ESTERS AND PARTIAL SALTS OF REACTION PRODUCTS OF NATURAL RESINIC ACIDS AND DICARBOXYLIC ACID COMPOUNDS

This invention relates to a process for the preparation of partial esters and partial salts of reaction products of natural resinic acids and unsaturated dicarboxylic acid compounds.

British Patent No. 1 230 240 describes the modification of natural resinic acids with phenolic resins or maleic resins and the use of these modified products, and also calcium or zinc resinates thereof, in the preparation of printing inks. This Specification also describes the preparation of printing ink binding agents by the reaction of natural resinic acids with phenolformaldehyde condensation products in the presence of metal salt catalysts such as zinc or calcium salts and the like and the esterification of these products with polyhydric alcohols. These latter products are also intended for the preparation of printing inks.

These products have a melting point of at least 120° C. (capillary method) and viscosities of 100 to 600 mPa.s (50% toluene/20° C. Ubbelohde). They may also be in the form of partial salts by reaction with the calcium and/or zinc compounds, which results in an increase in the melting point and also an improvement in the other properties of the products, nevertheless in these partial salts the proportion of metal is only small. The said products are suitable as binding agents for high-grade printing inks especially for toluene gravure printing inks. As a result of salt formation, the release of solvent from and dispersability of the gravure printing inks are favourably influenced. On printing, such inks therefore have a good stability, high gloss and good intensity of colour on conventionally used printing papers. Whereas red and blue pigments in known printing inks remain largely stable in colour tone and storage, inks with various yellow pigments generally have insufficient stability in storage and show undesirable signs of turning green.

German Offenlegungsschrift No. 24 42 526 discloses the reaction of a carboxylated resin with a compound of a metal of Group II of the Periodic Table according to Mendeleev to form corresponding salts, e.g. calcium salts. In the process described the starting materials are addition products of petroleum resins with unsaturated aliphatic monocarboxylic or dicarboxylic acid compounds, e.g. maleic acid anhydride. The products of the process are also intended as binding agents for gravure printing inks. Here, however, no phenolic resin component and also no natural resinic acid is used.

According to one aspect of the present invention there is provided a process for the preparation of partial esters and partial salts with divalent metal compounds of reaction products of natural resinic acids and unsaturated dicarboxylic acid compounds having unsaturated dicarboxylic acid units which comprises the following steps:

(a) reacting at least one natural resinic acid with from 3 to 10, preferably 4 to 8% by weight, relative to the weight of natural resinic acid, of an olefinically unsaturated dicarboxylic acid compound at a temperature of from 120° to 250°, preferably 150° to 200° C.;

(b) partially neutralising the product of step (a) with from 0.1 to 2.5, preferably to 2% by weight, relative to the weight of natural resinic acid of at least one calcium compound at a temperature within the range specified in step (a);

(c) partially esterifying the product of step (b) with from 10 to 30, preferably 10 to 16% by weight, relative to the weight of natural resinic acid, of a polyhydric alcohol at a temperature of from 120° to 200°, preferably 140° to 260° C.;

(d) reacting the product of step (c) with 5 to 20, preferably 5 to 15, especially 7 to 12% by weight, relative to the weight of natural resinic acid, of (i) a mixed resol prepared by co-condensation of at least one phenol and at least one alkyl phenol or (ii) a mixture of at least one phenolic resol and at least one alkyl phenol resol at a temperature of from 140° to 200°, preferably 160° to 180° C.; and (e) continuing the reaction of step (d) at a temperature of from 240° to 280° C., preferably at 240° to 260° C., to simultaneously complete partial salt formation and partial esterification, until the product has an acid number of 20 to 50.

The term "polyhydric alcohol" is used herein to mean an alcohol having two or more hydroxyl groups.

The products prepared according to the process of the invention are distinguished by especially favourable properties as printing ink binding agents, especially for toluene gravure printing. Thus, the process according to the invention permits the preparation of products which remain stable in storage even in the presence of yellow pigments and hardly turn green, if at all. They generally have melting points of at least 125° C. (capillary method) and a viscosity of 100 to 600, preferably 200 to 450 mPa.s (50% toluene/20° C.). The viscosity of the products may vary within the range specified, depending on the type and quantity of the dicarboxylic acid compounds, the polyhydric alcohols and the resols.

Natural resinic acids which may be used in the process of the invention include, for example, colophony, especially balsam colophony; root resins; and talloil resins, either alone or in admixture.

Examples of dicarboxylic acid compounds for use in the process of the invention are acids having up to 5 carbon atoms, such as fumaric acid, itaconic acid and especially maleic acid, and preferably the anhydrides thereof.

Calcium oxide, and also calcium hydroxide or calcium acetate or a combination thereof are especially suitable for use in the reaction of step (b) of the process.

Polyhydric alcohols which may be used for the partial esterification of step (c) of the process are preferably trihydric alcohols or alcohols of higher functionality, such as for example, glycerol, trimethylolethane or -propane, pentaerythritol and dipentaerythritol, either alone or in admixture. These alcohols may also be used optionally in admixture with dihydric alcohols such as ethandiol, the propandiols, butandiols, pentandiols or hexandiols, although dihydric alcohols may only be present in minor amounts, for example, in a proportion of at most 40 equivalent % of the total quantity of alcohol used in step (c).

Step (d) of the process is conveniently effected using a mixed resol in which the molar ratio of phenols to alkyl phenols is (0.5 to 1): (1 to 0.5), preferably (0.5 to 1):1, and the molar ratio of the sum of the phenols and alkyl phenols to formaldehyde is 1:(1.1 to 2).

Phenols which may be used in the mixed resols are, for example, phenol itself, diphenylolpropane and -methane. The alkyl radicals of the alkyl phenols are generally straight-chained or branched having from 1 to 12, preferably 1 to 9 carbon atoms. Examples of suitable alkyl phenols are the various cresols, p-tert.-butyl phenol, octyl phenol, nonyl phenol and dodecyl phenol.

It is also possible to effect the process with the preparation of mixed resols during the reaction in step (d), so that this step starts from a mixture of different resols, e.g. a phenolic resol and an alkyl phenol resol, which do not form a mixed resol until during the reaction. In general, however, the use of an already prepared mixed resol is preferred. Any alkaline catalyst originating from a condensation reaction may also remain in the reaction mixture, and does not therefore need to be washed out of the resols before use with the process of the invention. On the contrary it may contribute, together with the calcium compound(s) to the partial salt formation in the products.

The products according to the invention are very soluble in aromatic hydrocarbons, especially in toluene. Since they also wet pigments very well, they are especially suitable as binding agents for toluene gravure printing inks.

Thus according to another aspect of the invention, there are provided printing inks incorporating at least one partial ester and partial salt of a reaction product of natural resinic acids and unsaturated dicarboxylic acid compounds prepared according to the process of the invention.

The printing inks according to the invention show rapid drying, a high gloss, good intensity of colour and good stability on coated and uncoated paper.

The storage properties of toluene gravure printing inks according to the invention containing yellow pigments are especially advantageous, because not only does their viscosity remain largely unchanged but they also show substantially lower tendencies to turn green than when conventional resinates are employed.

The following Examples serve to illustrate the present invention.

Unless otherwise specified, in the Examples T represents parts by weight and % represents percent by weight. The viscosities always relate to 50% toluene solutions at 20° C. The melting points (mp) were determined by the capillary method.

| Resols The following resols were used: | Resol A | Resol B | Resol C | Resol D |
|---|---|---|---|---|
| Viscosity (Ubbelohde/20° C. mPa.s | 2400 | 1500 | 2000 | 1200 |
| Content of free formaldehyde % | 2.5 | 2.6 | 3.0 | 2.2 |
| Starting materials: | | | | |
| Phenol (T) | 576 | 852 | 650 | 700 |
| p-tert.-Butyl-phenol (T) | 1800 | 1350 | — | — |
| Octyl phenol (T) | — | — | 720 | — |
| Amyl phenol (T) | — | — | — | 750 |
| Paraformaldehyde (T) | 930 | 840 | 540 | 648 |
| Water (T) | 56 | 175 | 60 | 60 |
| NaOH, 33% (T) | 150 | 150 | 150 | 150 |
| Xylene (T) | 260 | 240 | 150 | 160 |

EXAMPLES 1 TO 11

In step (a) the natural resinic acids mentioned in Table 1 are melted together with maleic acid anhydride and heated for 1 hour up to 180° C. The mixture has added to it the calcium compound and is kept at 180° C. for approximately 10 minutes. Thereupon, glycerol and then pentaerythritol are added. After cooling to 160° C., the resol is added and the mixture is kept at this temperature for 1 to 2 hours. It is then heated to 250° C. and partial salt formation and partial esterification are completed at this temperature, until the acid number has dropped to not more than 40. The following Table 1 gives a summary of steps (a) to (e) for these Examples.

Table 1

| Example | 1 | 2 | 3 | 4 | 5 | 6 | 7 | 8 | 9 | 10 | 11 |
|---|---|---|---|---|---|---|---|---|---|---|---|
| Portuguese Colophony (mp.65° C., acid no. 165) | T 1100 | — | — | — | — | 1000 | — | — | — | — | 1100 |
| Chinese colophony (mp. 60° C., acid no. 165) | T — | 1150 | — | — | 1150 | 725 | 1000 | 1150 | 1150 | 1150 | — |
| American root resin (mp. 62° C., acid no. 162) | T — | — | 1150 | — | — | — | 725 | — | — | — | — |
| American talloil resin (mp.58° C., acid no. 160) | T — | — | — | 1150 | — | — | — | — | — | — | — |
| Maleic acid anhydride | T 50 | 50 | 50 | 60 | 60 | 78.5 | 90 | 60 | 60 | 50 | 50 |
| CaO | T 21.5 | 21.5 | 16 | 23 | 21 | 31.5 | 31.5 | 21.5 | 21.5 | 21.5 | 21.5 |
| Glycerol | T 16 | 16 | 16 | 40 | 18 | 27 | 27 | 20 | 20 | — | — |
| Trimethylolpropane | T — | — | — | — | — | — | — | — | — | 25 | — |
| Pentaerythritol | T 140 | 140 | 140 | 125 | 147 | 220 | 220 | 140 | 140 | 140 | 110 |
| Ethylene glycol | T — | — | — | — | — | — | — | — | — | — | 40 |
| Resol A | T 132 | — | — | 100 | 138 | 212 | 210 | — | — | 132 | 132 |
| Resol B | T — | 132 | 132 | — | — | — | — | — | — | — | — |
| Resol C | T — | — | — | — | — | — | — | 140 | — | — | — |
| Resol D | T — | — | — | — | — | — | — | — | 140 | — | — |
| Yield | T 1327 | 1350 | 1370 | 1310 | 1407 | 2110 | 2108 | 1375 | 1382 | 1355 | 1334 |
| Melting point °C. | 140 | 142 | 134 | 131 | 138 | 135 | 132 | 139 | 137 | 144 | 133 |
| Acid number | 23 | 24 | 30 | 34 | 34 | 36 | 30 | 26 | 24 | 22 | 25 |
| Viscosity, mPa.s | 380 | 365 | 280 | 310 | 396 | 364 | 340 | 370 | 320 | 350 | 312 |

As can be seen from Table 1, the melting point has increased in relation to that of the starting resinic acids, while at the same time the acid number has dropped.

Printing test (A) Preparation of Printing Inks

The products according to Examples 1 to 11 of the invention were dissolved in toluene and mixed with suitable pigments. For red inks, 20% red pigment was added; for blue inks, 16% blue pigment was added, and for yellow inks, 13% yellow pigment was added. In each case 100 I of 50% toluene solutions were mixed with enough toluene to ensure that a run-out time of 17 seconds in a DIN 4 mm beaker was obtained.

As comparison resins two conventional toluene gravure printing ink binding agents C and D were used and these had the following similar characteristics these comparison resins being present in the form of zinc salts:

Resin C: m.p. 140° C., acid number 32, viscosity 385 mPa.s.
Resin D: m.p. 145° C., acid number 38, viscosity 360 mPa.s.

(B) Test results and discussion

The test results are set out in Tables 2 and 3.

(a) Red inks and stability on paper was comparable with those of red inks.

Test of storage stability of yellow inks

For testing the storage stability, a part of the yellow inks was stored firstly in a refrigerator and then for 1 day at room temperature, and another part was stored for 7 days at 40° C. After storage for a further day at room temperature the inks stored cold and the inks stored at 40° C. were applied next to one another onto coated paper with a wet layer thickness of 12 μm by means of a wire spiral and their tendency to turn green was assessed. Also, the run-out time in a DIN 4 mm beaker was determined at 25° C.

The results are set out in Table 3. This Table shows that the products prepared according to the invention and used as binding agents give yellow printing inks not only having a better stability in storage but also having a better stability of colour tone.

TABLE 2

| Example | (c) Red inks | | | | | | (b) Blue inks | | | | | Comparison Resins | |
|---|---|---|---|---|---|---|---|---|---|---|---|---|---|
| | 1 | 2 | 3 | 4 | 5 | 6 | 1 | 4 | 5 | 6 | 7 | C | D |
| DIN 4mm run-out time of inks at 25° C. (s) | 16.9 | 17 | 17.2 | 17 | 16.8 | 17 | 17 | 16.8 | 16.9 | 17 | 17 | 16.9 | 17 |
| Drying time of a 36μm wet layer on coated paper (s) | 44 | 45 | 47 | 50 | 46 | 44 | 43 | 48 | 44 | 43 | 47 | 46 | 47 |
| Print gloss | 67 | 69 | 70 | 82 | 72 | 67 | 90 | 85 | 83 | 80 | 78 | 68 | 70 |
| Stability of 6μm wet layer thickness on 60g/m² coated paper: | | | | | | | | | | | | | |
| As good as inks C and D | − | − | − | + | − | + | − | + | + | + | + | + | + |
| Better than inks C and D | + | + | + | − | + | − | − | − | − | − | − | | |
| Worse than inks C and D | − | − | − | − | − | − | + | − | − | − | − | | |
| DIN 4mm run-out time after 14 days at 24° C. (s) | 20 | 19 | 21 | 22 | 21 | 22 | 26 | 24 | 26 | 28 | 28 | 21 | 22 |

Table 3

| Example | Yellow inks | | | | | | | | | | | Comparison resin | |
|---|---|---|---|---|---|---|---|---|---|---|---|---|---|
| | 1 | 2 | 3 | 4 | 5 | 6 | 7 | 8 | 9 | 10 | 11 | C | D |
| DIN 4 mm run-out time of inks/25° C./s: | | | | | | | | | | | | | |
| After preparation | 16.8 | 17 | 17.1 | 17 | 17 | 16.9 | 17.1 | 17 | 16.8 | 17.3 | 16.7 | 17 | 17.1 |
| After storage at 40° C. | 22 | 23.6 | 22.9 | 23.8 | 24 | 24.4 | 23.9 | 22.5 | 24.6 | 24.8 | 23.5 | 95 | 102 |
| Turning green of inks: | | | | | | | | | | | | | |
| weak | + | + | + | + | + | + | + | + | + | + | + | − | − |
| strong | − | − | − | − | − | − | − | − | − | − | − | + | + |

Red inks, with the exception of Example 4, dry at least equally rapidly in relation to the Comparison samples. Furthermore, however, the inks with equally rapid drying times have a higher gloss or increased stability on paper.

(b) Blue inks

The findings for the red inks also apply to blue inks. Only in Example 1 is the stability on paper poorer than with the Comparison samples. However, Example 1 shows more rapid drying and a higher gloss.

(c) Yellow inks

Substantially the same results (not given in Table 3) as with the red inks apply also to yellow inks. However, drying was on average approximately five seconds longer than with red inks. On the other hand, the gloss It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A process for the preparation of partial esters and partial salts with divalent metal compounds of reaction products of natural resinic acids and unsaturated dicarboxylic acid compounds having unsaturated dicarboxylic acid units which comprises the following steps:
   (a) reacting at least one natural resinic acid with from 3 to 10% of an olefinically unsaturated dicarboxylic acid compound at a temperature of from 120° to 250° C.;

(b) partially neutralising the product of step (a) with from 0.1 to 2.5% of at least one calcium compound at a temperature within the range specified in step (a);

(c) partially esterifying the product of step (b) with from 10 to 30% of a polyhydric alcohol at a temperature of from 120° to 200° C.;

(d) reacting the product of step (c) with 5 to 20% of (i) a resol prepared by co-condensation of at least one phenol and at least one alkylphenol or (ii) a mixture of at least one phenolic resol and at least one alkylphenol resol at a temperature of from 140° to 200° C.; and (e) continuing the reaction of step (d) at a temperature of from 240° to 280° C. to simultaneously complete partial salt formation and partial esterification, until the product has an acid number of from 20 to 50; the percentage in (a) to (d) being always by weight, relative to the weight of natural resinic acid.

2. A process as claimed in claim 1 wherein the reaction is performed in step (a) and (b) between 150° and 200° C., in step (c) between 140° and 260° C., in step (d) between 160° and 180° C. and in step (e) between 240° and 260° C.

3. A process as claimed in claim 1 wherein in step (b) a calcium compound selected from the group consisting of calcium oxide, calcium hydroxide, calcium acetate and a combination thereof is reacted.

4. A process as claimed in claim 1 wherein in step (c) an at least trihydric alcohol is reacted.

5. A process as claimed in claim 1 wherein in step (c) the amount of the dihydric alcohol is at most 40 equivalent-% of the total amount of alcohol reacted in this step.

6. A process as claimed in claim 1 wherein in step (d) a resol (i) is reacted which is obtained by co-condensation of phenols to alkylphenols in a molar ratio of 0.5:1 to 1:1 and applying a molar ratio of the total of phenols and alkylphenols to formaldehyde of from 1:1.1 to 1.2.

7. A process as claimed in claim 1 wherein the product obtained in the fifth step has a melting point of at least 125° determined by the capillary method and a viscosity between 100 and 600 mPa.s determined in a 50% toluene solution at 20° C.

8. A printing ink composition containing as an essential ingredient a reaction product prepared by the process of claim 1.

9. A composition as claimed in claim 8 which is a toluene gravure printing ink composition.

10. A composition as claimed in claim 8 additionally containing a yellow pigment.

* * * * *